J. G. Trotter,
Roasting Ores.
No. 109,559. Patented Nov. 22, 1870.

Witnesses
Charles L. Barritt
Franklin Barritt

Inventor
Jonathan George Trotter

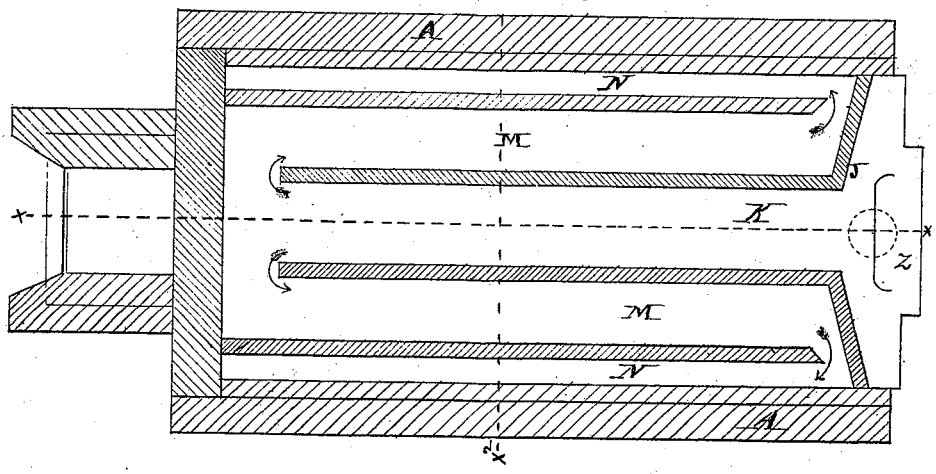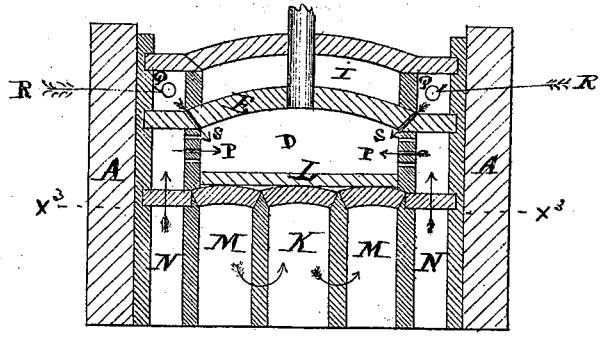

United States Patent Office.

JONATHAN GEORGE TROTTER, OF NEWARK, NEW JERSEY.

Letters Patent No. 109,559, dated November 22, 1870.

IMPROVEMENT IN FURNACES FOR DESULPHURIZING ORES.

The Schedule referred to in these Letters Patent and making part of the same.

*To all whom it may concern:*

Be it known that I, JONATHAN GEORGE TROTTER, of Newark, Essex county and State of New Jersey, have invented certain new and useful Improvements in Gas-Generating Furnaces for Desulphurizing and Deoxidizing the Ores of Iron and other metals; and I do hereby declare that the following is a full description of the same.

The nature of my invention consists—

First, in combining with a furnace and desulphurizing-oven, steam or vapor-flues in the side walls of the oven, and front walls or fire-bridge, having outlets therefrom into the oven for the escape of the heated vapor or steam into the oven, to combine with the gases generated therein to promote the operation of desulphurizing the ores.

Second, in combining and arranging, with a furnace and desulphurizing-oven, a series of flues whereby the heat and gases of the furnace are carried over the oven, and down and through the forward or return flues under the same, and thence into flues at opposite sides of the oven, from whence it escapes through vents in the oven to commingle with and act upon the ores to free the oxygen therefrom.

But to describe my invention more particularly, I will refer to the accompanying drawing forming a part of this specification, the same letters of reference wherever they occur referring to like parts.

Figure 1:
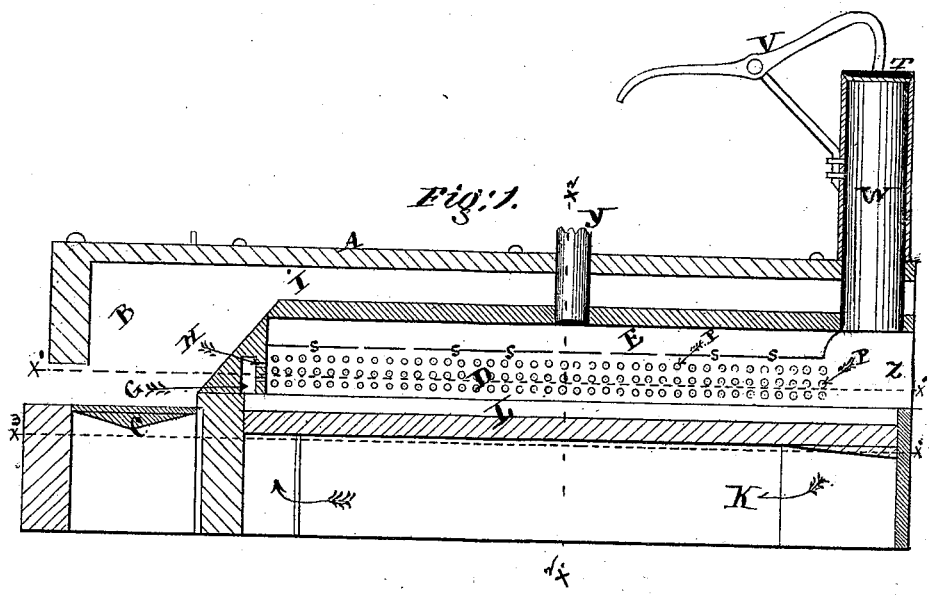

Sheet 1, Figure 1 is a longitudinal cut section of the furnace and oven on the line $x\,x$, fig. 4.

Figure 2:
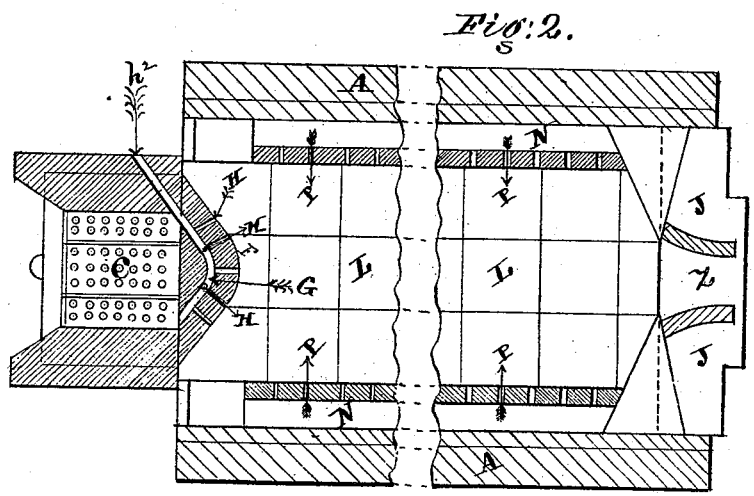

Sheet 1, Figure 2 is a plan view of the same through line $x^1\,x^1$, fig. 1.

Sheet 2, Figure 3 is a transverse cut section of the same through the line $x^2\,x^2$, figs. 1 and 4.

Sheet 2, Figure 4 is a plan view of the same through the line $x^3\,x^3$, figs. 1 and 3.

Letter A represents the outer walls of the furnace and oven, made of any of the well-known materials for such purposes.

B is the fire-place, and

C the grate-bars, underneath which is a closed ash-pit, ash-pit, into which atmospheric air is forced to support the combustion of the fuel.

Behind the fire-place is arranged the desulphurizing-oven D, having an arched roof, E, somewhat like a reverberatory furnace, and separated from the fire-place by a wall or bridge, F, in which is formed a chamber, G, having a series of outlet-holes H, leading into the oven.

This chamber is intended as a receptacle for steam, which is let into it through the sides of the furnace by suitable pipes $h^2$, and on reheating therein, escaping into the oven, through the holes H, to combine with the gases and ores to promote the desulphurizing process.

Letter I is a flue between the roof of the oven and the shell of the oven, through which the flame and gases from the furnace escape to the back end of the oven, where it descends through the openings J, and thence through a central flue, K, under the bed L of the oven, toward its front end, (see arrows, fig. 4,) and then back through the return-flues M.

From this point it then passes up into the side flues N, at each side of the oven, and escapes therefrom through the perforations P, into the oven, and over and upon and through the ores to promote the deoxidizing process.

To further promote the desulphurizing operation, a steam-chamber or flue, Q, is formed in the sides of the oven just above the side or gas-flues N.

Into this flue or chamber Q steam is introduced through the pipes R, and escapes therefrom by the holes S through the sides of the oven into the same, where it unites with the steam let in through the bridge to combine with the ores to promote the disengagement of the sulphur therefrom.

For the purpose of regulating the pressure of the gases in the furnace or oven, an adjustable damper, T, is arranged on the lever V to close the top of the chimney W, at the discretion of the attendant, to limit the escape of the gases from the furnace.

Letter Y is a charging-hole through the top of the oven, through which the ore is introduced, and Z is an opening in the back end of the oven, for the purpose of drawing off the ore, and raking and stirring it up when necessary during the operations of desulphurizing or deoxidizing it.

Having now described my invention,

I will proceed to set forth what I claim and desire to secure by Letters Patent.

1. The combination of the bridge F with a steam-chamber G and vents H, substantially as described, and for the purposes hereinbefore set forth.

2. The combination of the oven D with the vapor of water or steam-flue or chambers Q, and vents S, substantially as described, and for the purposes hereinbefore set forth.

3. The combination of the oven D with flues K, M, and N, and vents P, for discharging the gases in a diffused state into the oven, substantially as described, and for the purposes hereinbefore set forth.

JONATHAN GEORGE TROTTER.

Witnesses:
CHARLES L. BARRITT,
FRANKLIN BARRITT.